(12) United States Patent
Kumagai

(10) Patent No.: US 11,114,914 B2
(45) Date of Patent: Sep. 7, 2021

(54) MOTOR

(71) Applicant: DMG MORI CO., LTD., Yamatokoriyama (JP)

(72) Inventor: Kazuhiro Kumagai, Yamatokoriyama (JP)

(73) Assignee: DMG MORI CO., LTD., Yamatokoriyama (JP)

(*) Notice: Subject to any disclaimer, the term of this patent is extended or adjusted under 35 U.S.C. 154(b) by 291 days.

(21) Appl. No.: 16/325,222

(22) PCT Filed: Apr. 28, 2017

(86) PCT No.: PCT/JP2017/016958
§ 371 (c)(1),
(2) Date: Feb. 13, 2019

(87) PCT Pub. No.: WO2018/055828
PCT Pub. Date: Mar. 29, 2018

(65) Prior Publication Data
US 2021/0057952 A1 Feb. 25, 2021

(30) Foreign Application Priority Data
Sep. 20, 2016 (JP) .............................. JP2016-182974

(51) Int. Cl.
*H02K 3/32* (2006.01)
*H02K 1/14* (2006.01)
*H02K 3/18* (2006.01)

(52) U.S. Cl.
CPC ............. *H02K 3/325* (2013.01); *H02K 1/146* (2013.01); *H02K 3/18* (2013.01)

(58) Field of Classification Search
CPC .. H02K 3/00; H02K 3/12; H02K 3/28; H02K 3/30; H02K 3/32; H02K 3/34; H02K 3/38;
(Continued)

(56) References Cited

U.S. PATENT DOCUMENTS

2012/0038238 A1* 2/2012 Ishikawa ................ H02K 19/22
310/208
2013/0127290 A1* 5/2013 Matsubara ............... H02K 3/38
310/208
(Continued)

FOREIGN PATENT DOCUMENTS

CN 104718685 A 6/2015
JP 5-161291 A 6/1993
(Continued)

OTHER PUBLICATIONS

International Search Report dated Aug. 1, 2017 in PCT/JP2017/016958 filed on Apr. 28, 2017.

*Primary Examiner* — Tran N Nguyen
(74) *Attorney, Agent, or Firm* — Oblon, McClelland, Maier & Neustadt, L.L.P.

(57) ABSTRACT

A motor includes a stator core, a first coil, and a second coil provided adjacent to the first coil in the radial direction. The first coil and the second coil do not coincide in position with each other as seen in the axial direction of the stator core. A first coil end portion of the first coil and a second coil end portion of the second coil respectively include a first facing portion and a second facing portion facing each other in the radial direction. The motor further includes an out-slot insulator interposed at least between the first facing portion and the second facing portion and provided so that at least a part of the first coil end portion and the second coil end portion is exposed.

7 Claims, 8 Drawing Sheets

(58) Field of Classification Search
CPC .. H02K 3/40; H02K 3/48; H02K 3/50; H02K 15/00; H02K 15/10
See application file for complete search history.

(56) References Cited

U.S. PATENT DOCUMENTS

| | | | |
|---|---|---|---|
| 2014/0246939 A1* | 9/2014 | Murakami | H02K 1/02 310/156.05 |
| 2014/0265711 A1 | 9/2014 | Koshino et al. | |
| 2014/0300236 A1 | 10/2014 | Takizawa et al. | |
| 2014/0300239 A1 | 10/2014 | Takizawa et al. | |
| 2015/0288240 A1 | 10/2015 | Berndl et al. | |

FOREIGN PATENT DOCUMENTS

| | | | |
|---|---|---|---|
| JP | 2010239740 | * | 10/2010 |
| JP | 2010-263764 A | | 11/2010 |
| JP | 2011-72071 A | | 4/2011 |
| JP | 2013-162669 A | | 8/2013 |
| JP | 2014-207840 A | | 10/2014 |

* cited by examiner (A)    (B)

MOTOR

TECHNICAL FIELD

The present invention relates to a motor.

BACKGROUND ART

With regard to a conventional motor, for example, Japanese Patent Laying-Open No. 2010-263764 discloses a dynamo-electric machine designed to prevent insulating sheets for a stator from slipping off or being damaged (PTL 1).

The dynamo-electric machine disclosed in PTL 1 includes outer coils and inner coils alternately disposed in the circumferential direction of a ring-shaped stator core, insulating sheets each having a phase-to-phase insulation portion and provided at a corresponding outer coil, and slot insulating sheets each provided at a corresponding inner coil.

A coil end of the outer coil has a traverse portion disposed on the outer side relative to a coil end of the inner coil in the radial direction, and stand-up portions extending inward from both ends of the traverse portion in the radial direction. The coil end of the inner coil has a traverse portion straddling stand-up portions of coil ends of a pair of adjacent outer coils. The insulating sheet is disposed so that the phase-to-phase insulation portion is interposed between the traverse portion of the coil end of the inner coil and the stand-up portion of the coil end of the outer coil. The slot insulating sheet insulates the inner coil from a slot of the stator core, and insulates the inner coil from the traverse portion of the coil end of the outer coil.

CITATION LIST

Patent Literature

PTL 1: Japanese Patent Laying-Open No. 2010-263764

SUMMARY OF INVENTION

Technical Problem

As disclosed in the above PTL 1, a motor is known in which an insulating sheet is interposed between coil ends of adjacent coils. In the dynamo-electric machine disclosed in PTL 1, the coil ends of the outer coils and the coil ends of the inner coils are three-dimensionally arranged in the radial direction and the axial direction of the stator core, which makes the structure of the insulating sheets intricate.

An object of the present invention is to solve the above problem, and to provide a motor that allows a simplified configuration of an insulator for insulating coil end portions from each other.

Solution to Problem

A motor according to the present invention comprises: a stator core including a ring-shaped yoke portion, and a plurality of teeth portions extending from the yoke portion in the radial direction and provided at intervals in the circumferential direction; a first coil provided adjacent to the yoke portion in the radial direction and wound around the teeth portion; and a second coil provided adjacent to the first coil in the radial direction and wound around the teeth portion. The first coil and the second coil do not coincide in position with each other as seen in the axial direction of the stator core. The first coil and the second coil respectively include a first coil end portion and a second coil end portion protruding from an end face of the stator core in the axial direction. The first coil end portion and the second coil end portion respectively include a first facing portion and a second facing portion facing each other in the radial direction. The motor further comprises an insulator interposed at least between the first facing portion and the second facing portion and provided so that at least a part of the first coil end portion and the second coil end portion is exposed.

Advantageous Effects of Invention

According to the present invention, a motor is provided that allows a simplified configuration of the insulator for insulating the coil end portions from each other.

DESCRIPTION OF EMBODIMENTS

Figure 1:
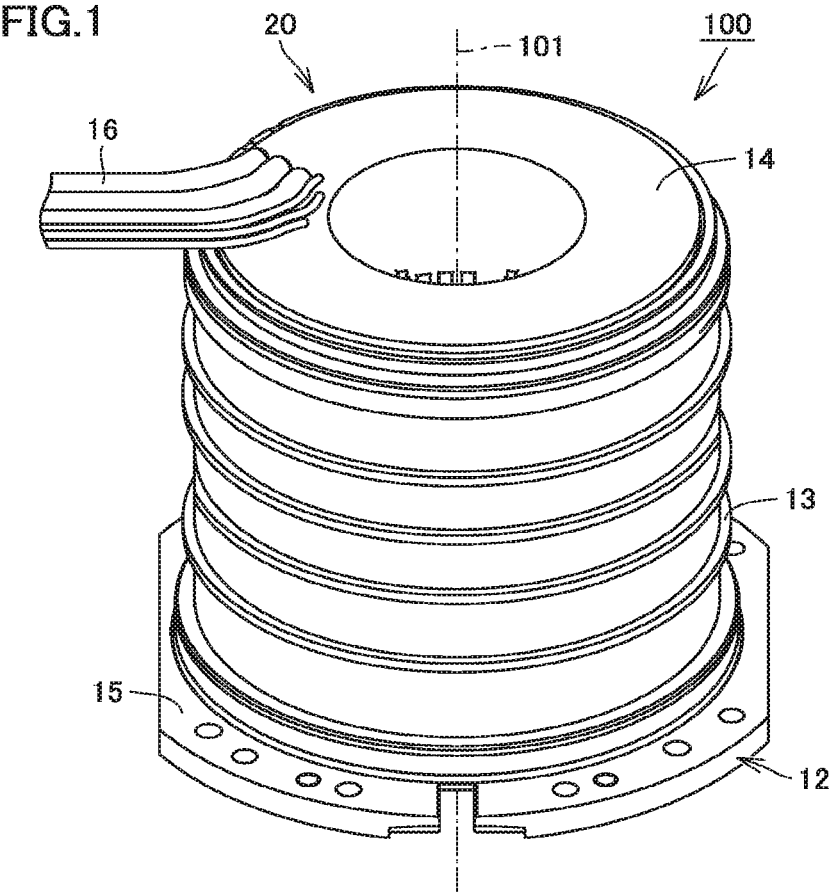
FIG. 1 is a perspective view showing a motor in an embodiment of the present invention.

An embodiment of the present invention is described with reference to the drawings. In the drawings which are referred to hereinafter, identical or corresponding members are identically denoted.

Figure 2:
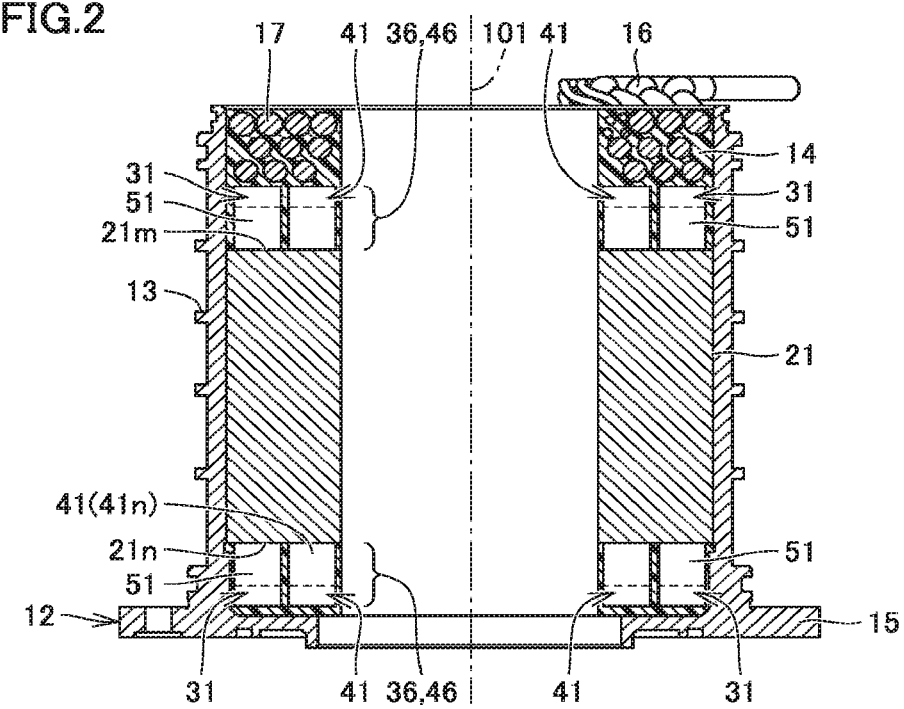
FIG. 2 is a cross-sectional view showing the motor in FIG. 1.

FIG. 1 is a perspective view showing a motor in an embodiment of the present invention. FIG. 2 is a cross-sectional view showing the motor in FIG. 1.

With reference to FIG. 1 and FIG. 2, a motor 100 in an embodiment of the present invention is for use in a machine tool. Motor 100 is, for example, included in a tool rest of a multitasking machine and is used as a motor for rotating a rotary tool attached to the tool rest.

Motor 100 includes a rotor (not shown), and a stator 20 disposed on the outer circumference of the rotor with a gap lying between the outer circumference and stator 20. The rotor rotates around a central axis 101 shown as a virtual line.

Figure 3:
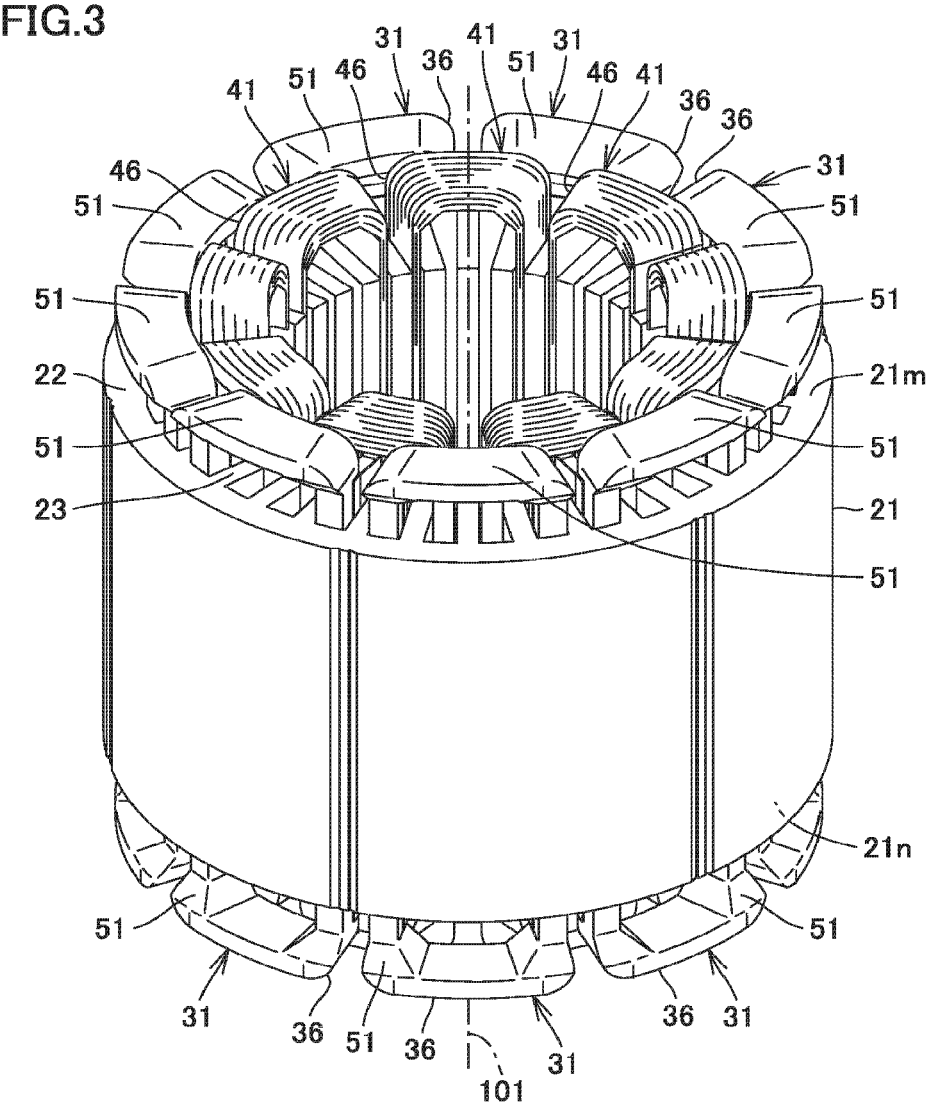
FIG. 3 is a perspective view showing the motor in FIG. 1, but without the flange, the resin sealing portion, and the wires.

FIG. 3 is a perspective view showing the motor in FIG. 1, but without the flange, the resin sealing portion, and the wires (lead wire 16 and connecting wire 17 in FIG. 2). FIG.

Figure 5:
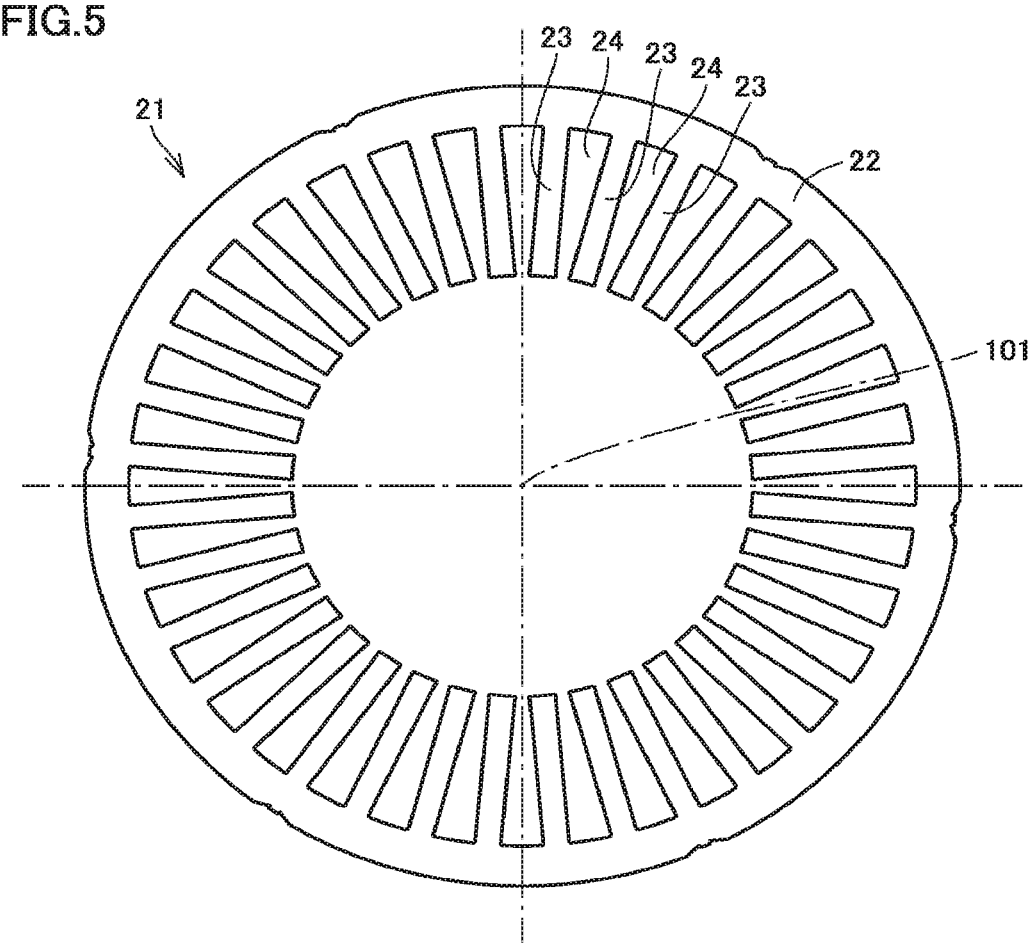
FIG. 5 is a top view showing a stator core alone included in the motor in FIG. 1.

4 is a top view showing the motor in FIG. 3. FIG. 5 is a top view showing a stator core alone included in the motor in FIG. 1.

With reference to FIG. 1 to FIG. 5, stator 20 includes a stator core 21, a flange (cylinder) 12, a first coil 31, a second coil 41, a resin sealing portion 14, an out-slot insulator 51, an in-slot insulator 53, and an in-slot insulator 54.

Stator core 21 has a cylindrical shape around central axis 101 as a whole. Stator core 21 is made of magnetic material. Stator core 21 has an end face 21m and an end face 21n. End face 21m and end face 21n are respectively disposed at one end and the other end of stator core 21 in the axial direction of central axis 101. Each of end face 21m and end face 21n extends in a plane orthogonal to central axis 101.

Stator core 21 includes a yoke portion 22 and a plurality of teeth portions 23, as its constituent parts (see FIG. 5). Yoke portion 22 is in the shape of a ring around central axis 101. Yoke portion 22 has a cylindrical shape around central axis 101. Teeth portions 23 extend from yoke portion 22 inward in the radial direction. The tip end of each teeth portion 23 extending from yoke portion 22 faces the rotor, with a gap lying between each teeth portion 23 and the rotor. The plurality of teeth portions 23 are provided at intervals in the circumferential direction around central axis 101. A slot 24 is defined between teeth portions 23 adjacent to each other in the circumferential direction.

Flange 12 has a cylindrical shape around central axis 101 as a whole. Flange 12 is made of metal. Stator core 21 is fitted in flange 12.

Flange 12 includes a coolant passage defining portion 13 and a brim 15, as its constituent parts. Coolant passage defining portion 13 is provided on the outer circumferential face of flange 12. Coolant passage defining portion 13 defines a coolant passage with a tube material (not shown) disposed over the outer circumference of flange 12, so that coolant (e.g. cooling water, cooling oil, or the like) can pass through the coolant passage. Brim 15 extends at the end of flange 12 in the axial direction of central axis 101. Brim 15 has a bolt hole for fixing motor 100.

First coil 31 and second coil 41 are provided in stator core 21. First coil 31 and second coil 41 are wound around teeth portions 23.

A plurality of first coils 31 are arranged in the circumferential direction of stator core 21. A plurality of second coils 41 are arranged in the circumferential direction of stator core 21. First coil 31 and second coil 41 are provided at different positions in the circumferential direction of stator core 21.

First coil 31 is adjacent to yoke portion 22 in the radial direction. Second coil 41 is adjacent to first coil 31 in the radial direction. First coil 31 is disposed between yoke portion 22 and second coil 41 in the radial direction of stator core 21. First coil 31 is an outer coil disposed on the outer side relative to second coil 41 in the radial direction of stator core 21. Second coil 41 is an inner coil disposed on the inner side relative to first coil 31 in the radial direction of stator core 21.

First coil 31 and second coil 41 are wound around teeth portions 23 by distributed winding. First coil 31 straddles at least one slot 24. Second coil 41 straddles at least one slot 24. First coil 31 and second coil 41 are wound around teeth portions 23 so that they pass through two slot 24 separated from each other in the circumferential direction of stator core 21 and pass over end face 21m and end face 21n.

Figure 6:
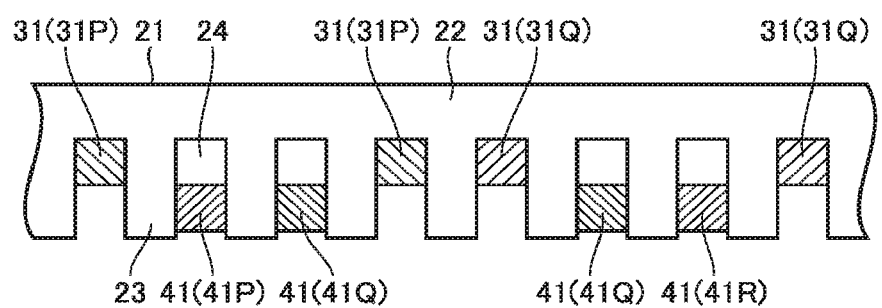
FIG. 6 is a diagram for explaining the state in which the coils are attached in the motor in FIG. 1.

FIG. 6 is a diagram for explaining the state in which the coils are attached in the motor in FIG. 1. FIG. 6 shows first coils 31 (31P, 31Q) and second coils 41 (41P, 41Q, 41R) attached to stator core 21 that is linearly developed.

The state in which first coil 31 and second coil 41 are attached is more specifically described with reference to FIG. 1 to FIG. 6. First coil 31 straddles two slots 24. Second coil 41 straddles two slots 24.

Second coil 41P and second coil 41Q pass through two slots 24 straddled by first coil 31P. Second coil 41Q and second coil 41R pass through two slots 24 straddled by first coil 31Q. First coil 31P and first coil 31Q pass through two slots 24 straddled by second coil 41Q.

Figure 7:
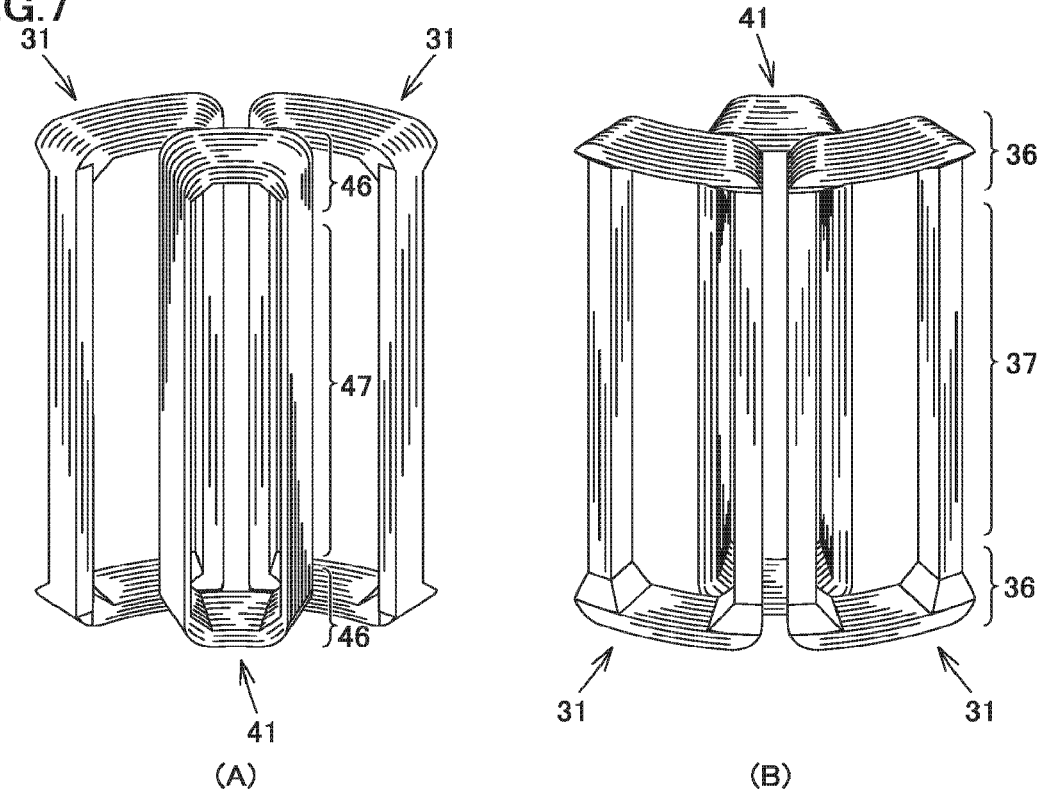
FIG. 7 shows the state in which the coils alone are attached in the motor in FIG. 1.

FIG. 7 shows the state in which the coils alone are attached in the motor in FIG. 1. FIG. 7 (A) shows the state in which the coils alone are attached, as seen from the inner side in the radial direction of stator core 21. FIG. 7 (B) shows the state in which the coils alone are attached, as seen from the outer side in the radial direction of stator core 21.

With reference to FIG. 1 to FIG. 7, first coil 31 and second coil 41 do not coincide in position with each other as seen in the axial direction of stator core 21 (in the axial direction of central axis 101).

More specifically, first coil 31 includes first coil end portions 36 and first coil intermediate portion 37, as its constituent parts. First coil end portions 36 are the parts of first coil 31 that protrude from end face 21m and end face 21n of stator core 21. First coil intermediate portion 37 is the part of first coil 31 that is disposed in slot 24. First coil intermediate portion 37 is located between first coil end portion 36 that protrudes from end face 21m and first coil end portion 36 that protrudes from end face 21n.

Second coil 41 includes second coil end portions 46 and second coil intermediate portion 47, as its constituent parts. Second coil end portions 46 are the parts of second coil 41 that protrude from end face 21m and end face 21n of stator core 21. Second coil intermediate portion 47 is the part of second coil 41 that is disposed in slot 24. Second coil intermediate portion 47 is located between second coil end portion 46 that protrudes from end face 21m and second coil end portion 46 that protrudes from end face 21n.

First coil end portions 36 are curved generally in a U-shape on end face 21m and end face 21n of stator core 21. Second coil end portions 46 are curved generally in a U-shape on end face 21m and end face 21n of stator core 21. First coil end portion 36 does not lie in the space in which second coil end portion 46 is projected in the axial direction of central axis 101. Second coil end portion 46 does not lie in the space in which first coil end portion 36 is projected in the axial direction of central axis 101. First coil end portion 36 and second coil end portion 46 are planarly disposed on the same plane orthogonal to central axis 101.

First coil intermediate portion 37 extends linearly in slot 24 along the axial direction of central axis 101. Second coil intermediate portion 47 extends linearly in slot 24 along the axial direction of central axis 101. First coil intermediate portion 37 and second coil intermediate portion 47 are disposed in different slots 24.

Resin sealing portion 14 fills slots 24. Resin sealing portion 14 covers first coil end portion 36 and second coil end portion 46 on end face 21m. Resin sealing portion 14 covers first coil end portion 36 and second coil end portion 46 on end face 21n.

Figure 4:
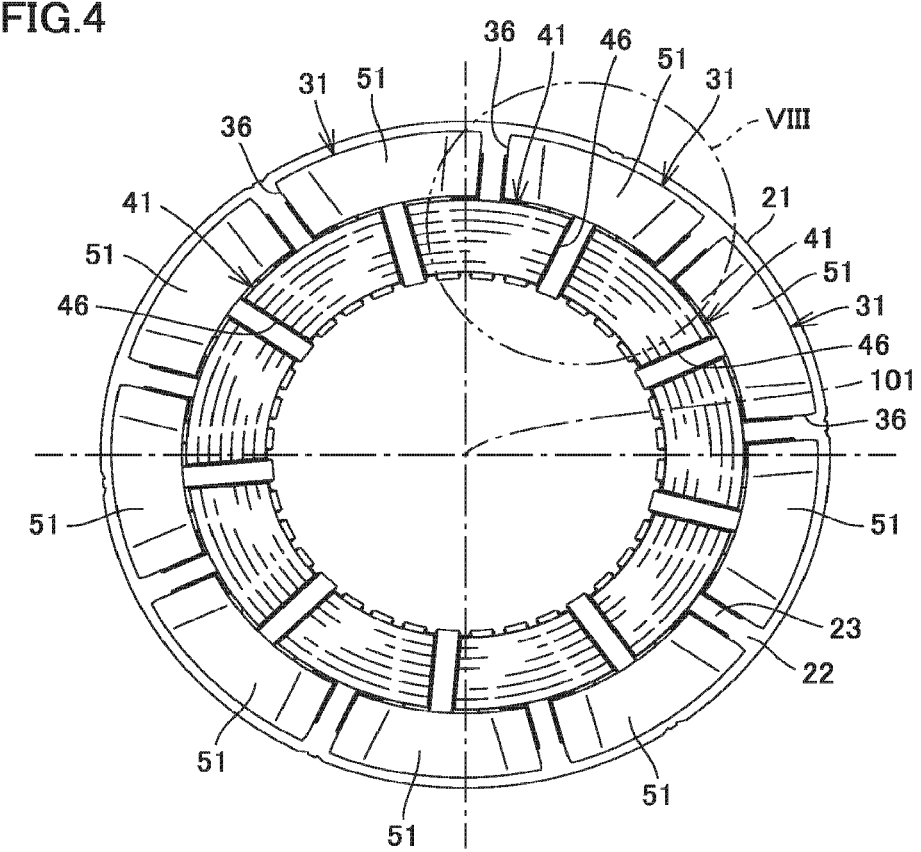
FIG. 4 is a top view showing the motor in FIG. 3.
Figure 8:
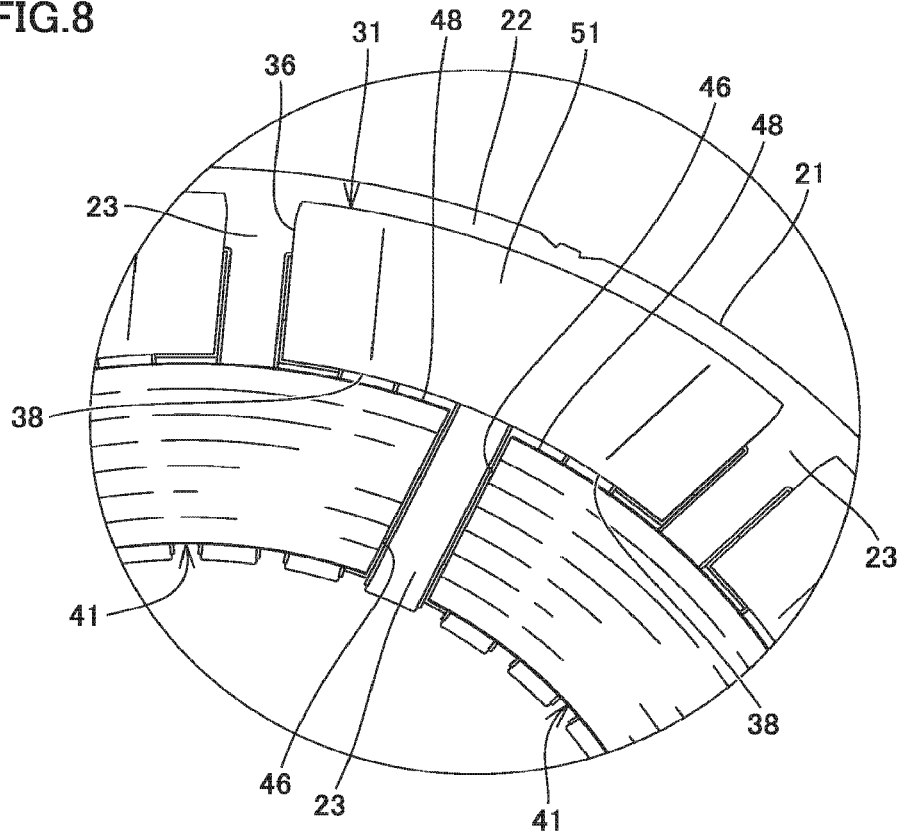
FIG. 8 is a top view of the motor showing the area defined by two-dot chain line VIII in FIG. 4.
Figure 9:
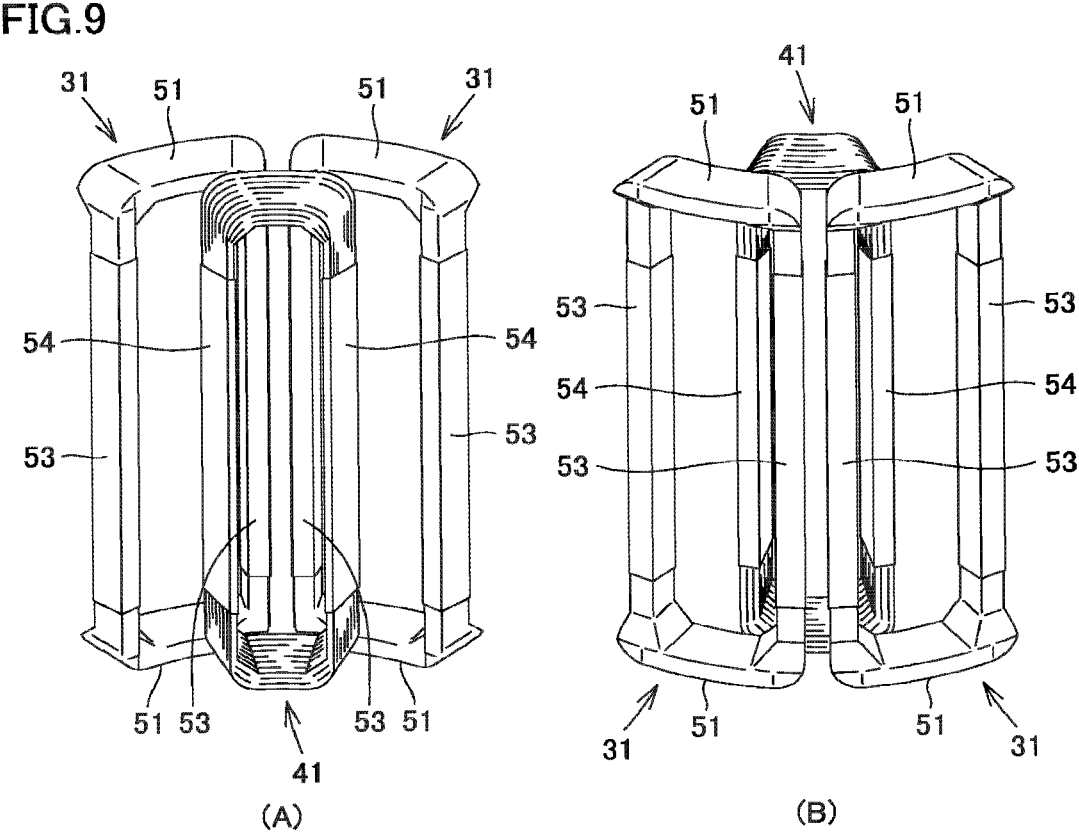
FIG. 9 shows the state in which insulators are attached to the coils in FIG. 7.

FIG. 8 is a top view of the motor showing the area defined by two-dot chain line VIII in FIG. 4. FIG. 9 shows the state in which insulators are attached to the coils in FIG. 7.

With reference to FIG. 1 to FIG. 9, first coil end portion 36 includes a first facing portion 38, as its constituent part. Second coil end portion 46 includes a second facing portion 48 as its constituent part. First facing portion 38 faces the inner side in the radial direction of stator core 21, and second facing portion 48 faces the outer side in the radial direction of stator core 21. First facing portion 38 and second facing portion 48 face each other in the radial direction of stator core 21.

Out-slot insulator 51 insulates first coil end portion 36 and second coil end portion 46 from each other on each of end face 21m and end face 21n.

Out-slot insulator 51 is interposed between first facing portion 38 and second facing portion 48 and is provided so that at least a part of first coil end portion 36 and second coil end portions 46 is exposed with no out-slot insulator 51. More specifically, out-slot insulator 51 is provided on first coil end portion 36. Out-slot insulator 51 is provided so that second coil end portion 46 is exposed with no out-slot insulator 51. First coil end portion 36 is covered with resin sealing portion 14 with out-slot insulator 51 lying therebetween. Second coil end portion 46 is directly covered with resin sealing portion 14.

Out-slot insulator 51 is made of insulating paper. As the insulating paper, for example, Nomex (registered trademark) manufactured by DuPont may be used. Out-slot insulator 51 is preferably made of tape-shaped insulating paper (long, narrow strip of insulating paper). Out-slot insulator 51 is wound around first coil end portion 36. Out-slot insulator 51 covers first coil end portion 36.

Out-slot insulator 51 may be made of any material that allows insulation between first coil end portion 36 and second coil end portion 46. However, using insulating paper as out-slot insulator 51 allows easy placement of out-slot insulator 51 at first coil end portion 36 regardless of the shape of first coil end portion 36.

Out-slot insulator 51 may be provided on second coil end portion 46, instead of first coil end portion 36. However, providing out-slot insulator 51 on first coil end portion 36 can enhance the insulating properties between first coil end portion 36 and flange 12, in addition to the insulating properties between first coil end portion 36 and second coil end portion 46.

The manner in which out-slot insulator 51 is provided is not limited to the above. For example, the insulating paper constituting out-slot insulator 51 may be interposed between first facing portion 38 and second facing portion 48.

In motor 100 in the present embodiment, first coil 31 and second coil 41 do not coincide in position with each other as seen in the axial direction of stator core 21. Therefore, on end face 21m and end face 21n, the parts of first coil end portion 36 and second coil end portion 46 that face each other can be reduced. This can simplify the configuration of out-slot insulator 51 for insulating the phases of first coil end portion 36 and second coil end portion 46 from each other. Further, the step of winding the insulating paper for providing out-slot insulator 51 can be simplified.

In-slot insulator 53 insulates first coil 31 and stator core 21 from each other in slot 24. In-slot insulator 53 is provided on first coil intermediate portion 37 of first coil 31. In-slot insulator 53 is made of insulating paper. In-slot insulator 53 covers first coil intermediate portion 37.

In-slot insulator 54 insulates second coil 41 and stator core 21 from each other in slot 24. In-slot insulator 54 is provided on second coil intermediate portion 47 of second coil 41. In-slot insulator 54 is made of insulating paper. In-slot insulator 54 covers second coil intermediate portion 47.

In-slot insulators 53, 54 may be provided in any manner that allows insulation between first coil 31 and second coil 41, and stator core 21. An example of the manner in which in-slot insulators 53, 54 are provided is describe hereinafter.

Figure 10:
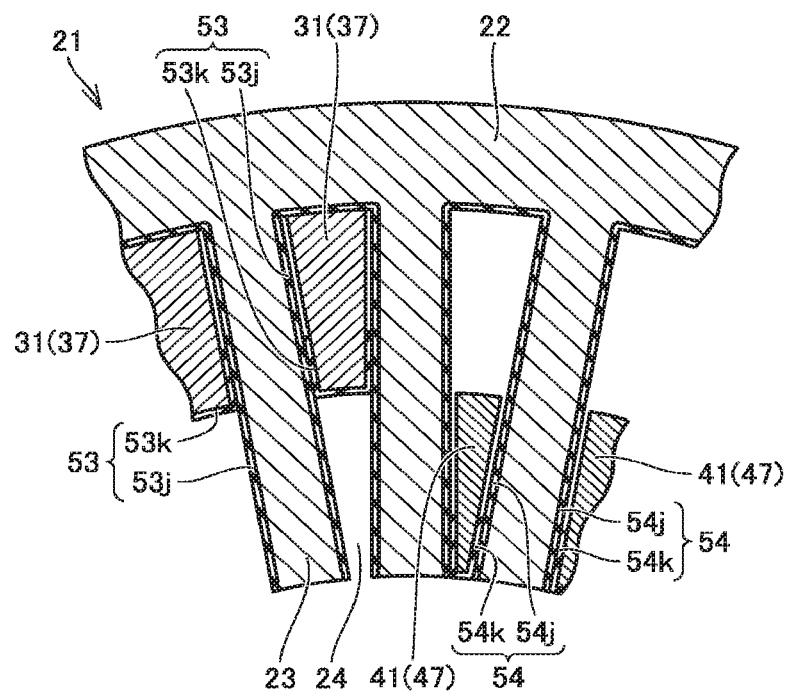
FIG. 10 is a cross-sectional view showing an example of the manner in which in-slot insulators are provided.

FIG. 10 is a cross-sectional view showing an example of the manner in which in-slot insulators are provided. With reference to FIG. 10, in-slot insulator 53 has a divided structure comprising an outer peripheral portion 53j and an inner peripheral portion 53k.

A cross section of outer peripheral portion 53j, taken along a plane orthogonal to central axis 101, is in the shape of a square bracket that surrounds first coil intermediate portion 37 of first coil 31 from the outer side in the radial direction of stator core 21. Outer peripheral portion 53j is provided along the inner wall of stator core 21 that defines slot 24. A cross section of inner peripheral portion 53k, taken along a plane orthogonal to central axis 101, is in the shape of a square bracket that surrounds first coil intermediate portion 37 of first coil 31 from the inner peripheral side. Combined outer peripheral portion 53j and inner peripheral portion 53k forms the shape of a frame that surrounds first coil intermediate portion 37.

In-slot insulator 54 has a divided structure comprising an outer peripheral portion 54j and an inner peripheral portion 54k. Outer peripheral portion 54j and inner peripheral portion 54k are respectively provided in the same manner as the above-described outer peripheral portion 53j and inner peripheral portion 53k. Combined outer peripheral portion 54j and inner peripheral portion 54k forms the shape of a frame that surrounds second coil intermediate portion 47.

The structure of motor 100 in an embodiment of the present invention described above is summarized as follows. Motor 100 in the present embodiment comprises: stator core 21 including ring-shaped yoke portion 22 and a plurality of teeth portions 23 extending from yoke portion 22 in the radial direction and provided at intervals in the circumferential direction; first coil 31 provided adjacent to yoke portion 22 in the radial direction and wound around teeth portions 23; and second coil 41 provided adjacent to first coil 31 in the radial direction and wound around teeth portions 23. First coil 31 and second coil 41 do not coincide in position with each other as seen in the axial direction of stator core 21. First coil 31 and second coil 41 respectively include first coil end portion 36 and second coil end portion 46 protruding from end faces 21m, 21n in the axial direction of stator core 21. First coil end portion 36 and second coil end portion 46 respectively include first facing portion 38 and second facing portion 48 facing each other in the radial direction. Motor 100 further comprises out-slot insulator 51 as an insulator interposed at least between first facing portion 38 and second facing portion 48 and provided so that at least a part of first coil end portion 36 and second coil end portion 46 is exposed.

Motor 100 in an embodiment of the present invention configured as above allows a simplified configuration of out-slot insulator 51 for insulating first coil end portion 36 and second coil end portion 46 from each other.

Figure 11:
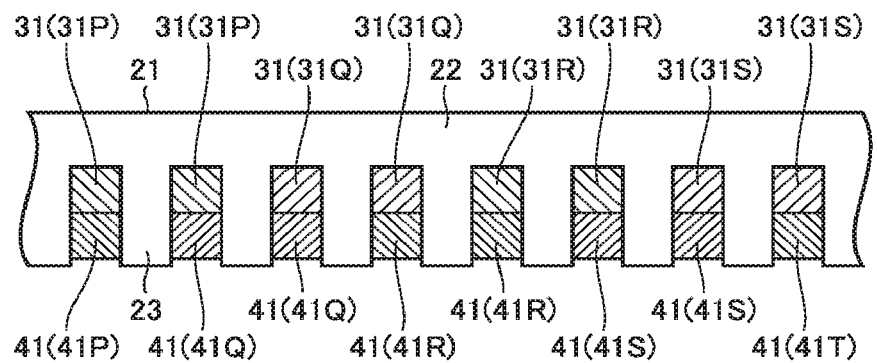
FIG. 11 shows a first variation of the state shown in FIG. 6 in which the coils are attached.

FIG. 11 shows a first variation of the state shown in FIG. 6 in which the coils are attached. FIG. 11 shows first coils 31 (31P, 31Q, 31R, 31S) and second coils 41 (41P, 41Q, 41R, 41S, 41T) attached to stator core 21 that is linearly developed.

With reference to FIG. 11, in the present variation, first coil 31 is wound around teeth portion 23 without straddling one slot 24. Second coil 41 is wound around teeth portion 23 without straddling one slot 24. First coil 31 and second coil 41 are provided at different positions in the circumferential direction of stator core 21. For example, second coil 41R is wound around teeth portion 23 located between first coil 31Q and first coil 31R.

In the present variation, out-slot insulator 51 is provided on first coil end portion 36 to insulate first coil end portion 36 and second coil end portion 46 from each other on end face 21m and end face 21n.

Figure 12:
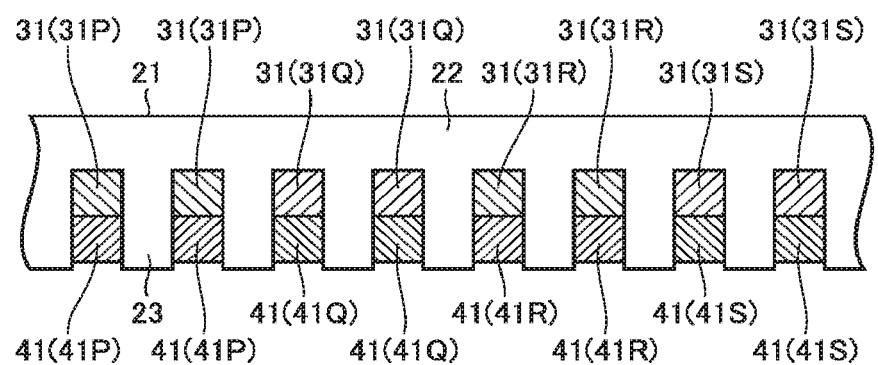
FIG. 12 shows a second variation of the state shown in FIG. 6 in which the coils are attached.
Figure 13:
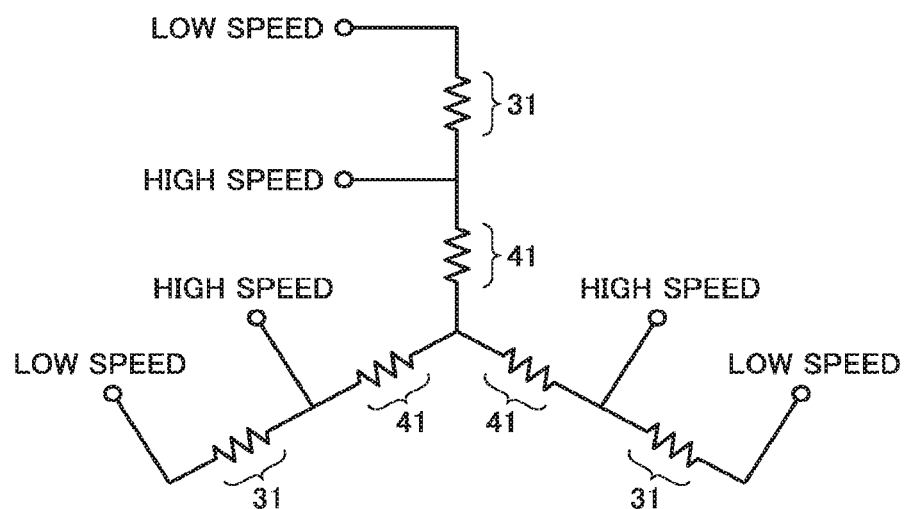
FIG. 13 is a circuit diagram of the coils shown in FIG. 12.

FIG. 12 shows a second variation of the state shown in FIG. 6 in which the coils are attached. FIG. 12 shows first coils 31 (31P, 31Q, 31R, 31S) and second coils 41 (41P, 41Q, 41R, 41S) attached to stator core 21 that is linearly developed. FIG. 13 is a circuit diagram of the coils shown in FIG. 12.

With reference to FIG. 12 and FIG. 13, in the present variation, first coil 31 is wound around teeth portion 23 without straddling one slot 24. Second coil 41 is wound around teeth portion 23 without straddling one slot 24. First coil 31 and second coil 41 are aligned in the circumferential direction of stator core 21.

First coil 31 and second coil 41 are configured to undergo winding changeover between low speed and high speed. Specifically, first coil 31 and second coil 41 are connected in series in each of the U-phase, the V-phase, and the W-phase. During rotation at low speed, a current flows through first coil 31 and second coil 41 in each of the U-phase, the V-phase, and the W-phase. During rotation at high speed, a current flows through only second coil 41 in each of the U-phase, the V-phase, and the W-phase.

In the present variation, out-slot insulator 51 is provided on first coil end portion 36 to insulate first coil end portion 36 and second coil end portion 46 from each other on end face 21m and end face 21n.

Although the present embodiment describes an inner rotor motor 100 in which the rotor is disposed inside stator 20, the present invention is also applicable to an outer rotor motor in which the rotor is disposed outside the stator. The present invention is also applicable to a motor for a main shaft of a machine tool or a motor for rotating a table.

A motor according to the present invention comprises: a stator core including a ring-shaped yoke portion, and a plurality of teeth portions extending from the yoke portion in the radial direction and provided at intervals in the circumferential direction; a first coil provided adjacent to the yoke portion in the radial direction and wound around the teeth portion; and a second coil provided adjacent to the first coil in the radial direction and wound around the teeth portion. The first coil and the second coil do not coincide in position with each other as seen in the axial direction of the stator core. The first coil and the second coil respectively include a first coil end portion and a second coil end portion protruding from an end face of the stator core in the axial direction. The first coil end portion and the second coil end portion respectively include a first facing portion and a second facing portion facing each other in the radial direction. The motor further comprises an insulator interposed at least between the first facing portion and the second facing portion and provided so that at least a part of the first coil end portion and the second coil end portion is exposed.

According to the motor configured as such, since the first coil and the second coil do not coincide in position with each other as seen in the axial direction of the stator core, the parts of the first coil end portion and the second coil end portion that face each other can be reduced. This can simplify the configuration of the insulator for insulating the first coil end portion and the second coil end portion from each other.

Preferably, the first coil and the second coil are provided at different positions in the circumferential direction.

According to the motor configured as such, for the motor in which the first coil and the second coil are disposed at different positions in the circumferential direction, simplification is achieved in the configuration of the insulator for insulating the first coil end portion and the second coil end portion from each other.

Preferably, a slot is formed between the teeth portions adjacent to each other. Each of the first coil and the second coil is wound around the teeth portions so as to straddle the at least one slot.

According to the motor configured as such, for the motor in which each of the first coil and the second coil straddles at least one slot, simplification is achieved in the configuration of the insulator for insulating the first coil end portion and the second coil end portion from each other.

Preferably, the teeth portion extends from the yoke portion inward in the radial direction. The motor further comprises a cylinder in which the stator core is fitted. The insulator covers the first coil end portion and is provided so that the second coil end portion is exposed.

According to the motor configured as such, the insulator can insulate the first coil end portion and the second coil end portion from each other, and can also enhance the insulating properties between the cylinder and the first coil end portion.

Preferably, the insulator is insulating paper and is wound around any one of the first coil end portion and the second coil end portion.

According to the motor configured as such, the step of winding the insulating paper around the coil end portion can be simplified.

It should be understood that the embodiments disclosed herein are by way of example in every respect, not by way of limitation. The scope of the present invention is defined not by the above description but by the terms of the claims, and is intended to include any modification within the meaning and scope equivalent to the terms of the claims.

INDUSTRIAL APPLICABILITY

The present invention is applicable to, for example, a motor for a machine tool.

REFERENCE SIGNS LIST

12: flange; 13: coolant passage defining portion; 14: resin sealing portion; 15: brim; 16: lead wire; 17: connecting wire; 20: stator; 21: stator core; 21m, 21n: end face; 22: yoke portion; 23: teeth portion; 24: slot; 31: first coil; 36: first coil end portion; 37: first coil intermediate portion; 38: first facing portion; 41: second coil; 46: second coil end portion; 47: second coil intermediate portion; 48: second facing portion; 51: out-slot insulating paper; 53, 54: in-slot insulator; 53j, 54j: outer peripheral portion; 53k, 54k: inner peripheral portion; 100: motor; 101: central axis

The invention claimed is:
1. A motor comprising:
 a stator core including
  a ring-shaped yoke portion, and
  a plurality of teeth portions extending from the yoke portion in a radial direction and provided at intervals in a circumferential direction defining slots between adjacent teeth portions in the circumferential direction;
 a first coil provided adjacent to the yoke portion in the radial direction and wound around the teeth portion; and a second coil provided adjacent to the first coil in the radial direction and wound around the teeth portion, the first coil and the second coil not coinciding in position with each other as seen in an axial direction of the stator core, the first coil and the second coil respectively including a first coil end portion and a second coil end portion protruding from an end face of the stator core in the axial direction and being curved generally in a U-shape on the end face of the stator core, the first coil and the second coil respectively including a first coil intermediate portion and a second coil intermediate portion extending linearly in one of the slots in the axial direction, the first coil intermediate portion and the second coil intermediate portion being disposed in different slots, the first coil end portion and the second coil end portion respectively including a first facing portion and a second facing portion facing each other in the radial direction, the first facing portion facing an inner side of the stator core in the radial direction and the second facing portion facing an outer side of the stator core in the radial direction, and the motor further comprising an out-slot insulator interposed at least between the first facing portion and the second facing portion, the out-slot insulator being provided on one of the first coil end portion and the second coil end portion and the other of the first coil end portion and the second coil end portion being exposed with no out-slot insulator.

2. The motor according to claim 1, wherein the first coil and the second coil are provided at different positions in the circumferential direction.

3. The motor according to claim 1, wherein
each of the first coil and the second coil is wound around the teeth portions so as to straddle at least one slot.

4. The motor according to claim 1, wherein
the teeth portion extends from the yoke portion inward in the radial direction, and
the motor further comprises a cylinder in which the stator core is fitted.

5. The motor according to claim 1, wherein the out-slot insulator is insulating paper and is wound around the one of the first coil end portion and the second coil end portion.

6. The motor according to claim 1, further comprising a flange presenting a cylindrical shape in which the stator core is fitted, the flange including a coolant passage defining portion provided on an outer circumferential face of the flange, and a brim extending at an end of the flange in the axial direction and including a bolt hole.

7. The motor according to claim 1, wherein a first in-slot insulator is provided on the first coil intermediate portion, and a second in-slot insulator is provided on the second coil intermediate portion, each of the first in-slot insulator and the second in-slot insulator including an outer peripheral portion provided along an inner wall of the stator defining one of the slots and an inner peripheral portion presenting a shape of a square bracket surrounding the respective coil intermediate portion from an inner peripheral side.

* * * * *